(12) United States Patent
Ogino et al.

(10) Patent No.: US 8,945,446 B2
(45) Date of Patent: Feb. 3, 2015

(54) APPARATUS AND METHOD FOR MANUFACTURING MULTIPLEX INTERLAYER FOR SAFETY GLASS

(75) Inventors: Kentarou Ogino, Shiga (JP); Takeshi Yoshida, Shiga (JP); Hiroaki Inui, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 512 days.

(21) Appl. No.: 13/413,710

(22) Filed: Mar. 7, 2012

(65) Prior Publication Data

US 2012/0228796 A1    Sep. 13, 2012

Related U.S. Application Data

(62) Division of application No. 12/513,728, filed as application No. PCT/JP2008/061542 on Jun. 25, 2008, now Pat. No. 8,152,507.

(30) Foreign Application Priority Data

Jun. 27, 2007    (JP) .................................. 2007-169783

(51) Int. Cl.
*B29C 47/06* (2006.01)
*B29C 47/00* (2006.01)
(Continued)

(52) U.S. Cl.
CPC ........... *B29C 47/065* (2013.01); *B29C 47/0021* (2013.01); *B29C 47/0047* (2013.01); *B29C 47/14* (2013.01); *B29L 2031/30* (2013.01); *B29L 2031/778* (2013.01)
USPC .................. 264/171.1; 264/173.16; 425/131.1

(58) Field of Classification Search
USPC .................. 264/171.1, 173.16; 425/131.1
See application file for complete search history.

(56) References Cited

U.S. PATENT DOCUMENTS 4,728,278 A    3/1988 Capelle
4,880,370 A    11/1989 Krumm
(Continued)

FOREIGN PATENT DOCUMENTS

AU    63940/65 A    3/1967
JP    7-40413 A    2/1995
(Continued)

OTHER PUBLICATIONS

Supplementary European Search Report for the Application No. EP 08 79 0609 dated Nov. 26, 2013.
(Continued)

*Primary Examiner* — James Sanders
(74) *Attorney, Agent, or Firm* — Cheng Law Group, PLLC

(57) ABSTRACT

Provided is a method for manufacturing a multilayered interlayer for safety glass that allows for reliable and easy formation of inserted layers having a larger coloring layer. The method for manufacturing includes processes for respectively delivering, from a first and a second extruding machine, thermoplastic resin composition(s) for the outermost and inserted layers formation in a molten state to the first and second delivering hole of the guide for layer disposition; a process for simultaneously forcing the thermoplastic resin composition(s) to respectively arrive in the outlets for the outermost and inserted layers formation through the flow paths for the outermost and inserted layers formation; and a process for extruding the thermoplastic resin composition(s) for the outermost and inserted layers formation as a multilayer film in a condition where the thermoplastic resin composition for the inserted layer formation is disposed between the thermoplastic resin compositions for the outermost layers formation.

8 Claims, 5 Drawing Sheets

(51) Int. Cl.
*B29C 47/14* (2006.01)
*B29L 31/30* (2006.01)
*B29L 31/00* (2006.01)

(56) References Cited

U.S. PATENT DOCUMENTS

| | | | |
|---|---|---|---|
| 5,154,870 A | 10/1992 | Urui et al. | |
| 5,256,357 A | 10/1993 | Hayward | |
| 5,419,696 A * | 5/1995 | Henson | 425/382.4 |
| 6,767,492 B2 * | 7/2004 | Norquist et al. | 264/173.15 |

FOREIGN PATENT DOCUMENTS

| | | |
|---|---|---|
| JP | 7-276464 A | 10/1995 |
| JP | 8-39648 A | 2/1996 |

OTHER PUBLICATIONS

International Search Report for the Application No. PCT/JP2008/061542 mailed Oct. 7, 2008.

* cited by examiner (a)

(b)

(a)

(b)

APPARATUS AND METHOD FOR MANUFACTURING MULTIPLEX INTERLAYER FOR SAFETY GLASS

CROSS REFERENCE TO RELATED APPLICATIONS

This application a Divisional application of patent application Ser. No. 12/513,728, filed on May 6, 2009 now U.S. Pat. No. 8,152,507 which is a 371 application of application No. PCT/JP2008/061542, filed Jun. 25, 2008 which is based on Japanese Patent Application No. JP2007-162783 filed on Jun. 27, 2007, the entire contents of which are hereby incorporated by reference.

TECHNICAL FIELD

The present invention relates to an apparatus for manufacturing an interlayer used for forming a safety glass for vehicles, buildings, etc., and in more detail, the present invention relates to an apparatus for manufacturing a multilayered interlayer for a safety glass obtained by lamination of a plurality of thermoplastic resin composition layers and to a method for manufacturing the multilayered interlayer.

BACKGROUND ART

Safety glasses are widely used for windows of automobiles, airplanes, and buildings. The safety glasses are referred to as laminated glasses. The safety glass has an interlayer containing synthetic resins inserted between two sheets of glass plates. In order to avoid obstruction of visibility, a transparent synthetic resin film is generally used as the above-described interlayer.

Windshields of automobiles preferably block transmission of sunlight within vision of drivers. Therefore, a colored belt for blocking sunlight is sometimes formed in the upper portion of the windshield. Such colored belts can be formed by attachment of a colored film on the interior surface or the outside surface of the windshield, or formation of a colored belt in the above-described interlayer.

Formation of the colored belt in the interlayer eliminates the necessity for additional attachment of the colored film to windshields, thereby avoiding problems, such as separation of the colored film.

Various interlayers have been proposed as interlayers having the colored belt provided therein. For example, known are interlayers with a three layered structure sandwiching a transparent synthetic resin film having a colored belt that is inserted into a pair of transparent synthetic resin films and that is printed in the formation area of the colored belt. Incidentally, interlayers with a colored belt having a partial three layered structure obtained by formation of a colored belt layer between a pair of outermost layers including a transparent synthetic resin by extrusion molding are also known.

In use of the above-described transparent synthetic resin film having a printed colored belt, it was necessary that the transparent synthetic resin film having the colored belt was sandwiched between two sheets of transparent resin films, and then these films were fused with each other by roll pressing etc. The interlayer a obtained by roll pressing, however, allowed easy involvement of air bubbles remaining within the interface between the laminated films. Incidentally, the interface between the thermally adhered films failed to develop sufficient adhesive strength. Furthermore, the interface obtained by thermal adhesion between the transparent synthetic resin film and the colored belt allowed occurrence of opaque lines in the delivery direction of the interlayer for production.

Following patent document 1 discloses an example of a method of forming an interlayer with a colored belt having partial three layered structure using extrusion molding method. In the document, a probe is inserted in a portion in which the direction of flow of the transparent main raw material resin composition is converted in a shape of a character L in production of an interlayer by extrusion molding using an L die. Then, injection of a coloring resin into the main raw material resin from an orifice of probe forms a partially colored belt in the interlayer containing the transparent main raw material resin.

Injection of coloring resins from an orifice into the main raw material resin gives a consequent blurry boundary line in one edge line of the colored belt. Accordingly, this method can form a gradation in which the grade of coloring gradually decreases in one edge line of the colored belt. Therefore, this method can form the above-described gradation in the edge line of the colored belt in safety glass, and can keep the vision satisfactorily even in the case where the colored belt comes into the vision of the driver.

Patent document 1: JP, 7-40413, A

DESCRIPTION OF THE INVENTION

However, since the manufacturing apparatus of the interlayer with a colored belt described in the patent document 1 injects a coloring resin in a molten state from an orifice of a probe into a main raw material resin, the apparatus inevitably needed disposition of support guide pegs for supporting the probe. Therefore, the main raw material resin in a molten state collides with the support guide pegs, resulting in potential variation of the flow of the main raw material resin that passes around the circumference of the support guide pegs. As a result, a shade might appear besides the above-described gradation in the formed colored belt. That is, easy occurrence of difference of color was unavoidable in the colored belt body part that needs constant coloring degree. Therefore, in manufacturing interlayers with colored belts using the L die, probes that do not have support guide pegs have been used for the orifice.

Windshields of automobiles are now becoming much larger in order to secure much wider vision. Accordingly, there occurs a necessity for formation of a colored belt having a larger length and having a width larger than the width in a certain width direction along with the upper and lower direction of the windshield. In formation of the colored belt with such a large dimension, a longer orifice of the probe needs to be used in order to use the above-described probe. However, a longer orifice needs a larger probe part that does not have support guide pegs, leading to consequent bending and easier breaking of the probe. Therefore, the manufacturing apparatus using the probe without support guide pegs in the orifice had extraordinary difficulty in formation of the colored belt having a larger dimension in a width direction.

An object of the present invention is to provide an apparatus and a method for manufacturing a multilayered interlayer for safety glass allowing secured and easy formation of an inserted layer, such as a larger coloring layer in a multilayered interlayer for safety glass.

According to the present invention, there is provided an apparatus for manufacturing a multilayered interlayer for safety glass having a first and a second outermost layers and an inserted layer disposed between the first and the second outermost layers, the apparatus comprising:

a first extruding machine for delivering a thermoplastic resin composition for the outermost layer formation for forming the first and the second outermost layers;

a second extruding machine for delivering a thermoplastic resin composition for the inserted layer formation for forming the inserted layer;

a first delivering hole through which the thermoplastic resin composition for the outermost layer formation is delivered, the first delivering hole being connected to the first extruding machine;

a second delivering hole through which the thermoplastic resin composition for the inserted layer formation is delivered, the second delivering hole being connected to the second extruding machine;

outlets for the first and the second outermost layers formation, the outlets for the first and the second outermost layers formation having a slit shape corresponding to sectional shapes of the first and the second layers;

an outlet for the inserted layer formation for forming the inserted layer, the outlet being disposed between the outlets for the first and the second outermost layers formation;

a flow path for the outermost layer formation connecting the first delivering hole and the outlets for the first and the second outermost layers formation;

a guide for a layer disposition, the guide having a flow path for the inserted layer formation that connects the second delivering hole and the outlet for the inserted layer formation;

a metal mold for extrusion for extruding the interlayer obtained by lamination of the resin compositions for the first and the second outermost layers formation, and the resin composition for the inserted layer formation that have been delivered, the metal mold being connected to the outlets for the first and the second outermost layers formation and the outlet for the inserted layer formation of the guide for the layer disposition, wherein the outlet for the inserted layer formation provided in the guide for a layer disposition has a shape of a slit extending in a width direction of the interlayer, and has a smaller thickness of the slit with increasing proximity to one end in at least the one end of the shape of a slit.

In the apparatus for manufacturing the multilayered interlayer for safety glass concerning the present invention, it is preferred that a first delivering hole provided in the guide for the layer disposition is connected to the first extruding machine for the outermost layer formation, one end of the flow path for formation of the outermost layer is connected to the first delivering hole in the guide for the layer disposition, the flow path for the outermost layer formation is branched to the first and the second branching flow paths midway therebetween, and ends of the first and the second branching flow paths are connected to outlets for the first and the second outermost layers formation, respectively. Accordingly, use of only one of the first extruding machine enables delivery of the thermoplastic resin composition for forming the first and the second outermost layers, leading to simplification of the whole manufacturing apparatus.

In the apparatus for manufacturing the multilayered interlayer for safety glass concerning the present invention, it is preferred that a pair of the first extruding machines are provided in order to form the first and the second outermost layers, a pair of the first delivering holes connected to a pair of the first extruding machines are respectively formed in the guide for a layer disposition, one of the delivering hole out of the pair of the first delivering holes is connected to the first outlet for the outermost layer formation, and another delivering hole is connected to the second outlet for the outermost layer formation. Since the first and the second thermoplastic resin compositions for the outermost layers formation are delivered from each of the first extruding machine through each of the delivering hole, the guide for a layer disposition does not need to have a complicated flow path having a branching flow path formed therein. Furthermore, the shape of the flow path for passing the thermoplastic resin compositions for forming the first outermost layer and the second outermost layer may be simplified in the guide for a layer disposition. Furthermore, the first outermost layer and the second outermost layer may be formed with thermoplastic resin compositions having different compositions with each other.

In the apparatus for manufacturing the multilayered interlayer for safety glass concerning the present invention, it is preferred that the thickness of the slit is smaller with increasing proximity to the end thereof in both ends of the outlet for the inserted layer formation having a shape of a slit. In this case, a gradation structure having a gradually decreasing thickness of the inserted layer may be formed in a portion where the thickness of the slit is smaller with increasing proximity to the end. The shape in which the thickness of the slit becomes smaller with increasing proximity to the end may be provided in both ends of outlet for the inserted layer formation. Furthermore, on one hand, the thickness of the slit may be smaller with increasing proximity to the end in one end of outlet for the inserted layer formation, and on the other hand the thickness of the slit may not be smaller with increasing proximity to the end, but the thickness of the slit may be constant in the other end.

In the apparatus for manufacturing the multilayered interlayer for safety glass concerning the present invention, at least one end of the outlet for the inserted layer formation is preferably aligned to the end of the outlets for the first and the second outermost layers formation in a width direction of the interlayer. In this case, on one end side in a width direction of the obtained interlayer, the inserted layer is formed between the first and the second outermost layers, and the inserted layer is formed nearer to one end side in the width direction of the interlayer.

In the apparatus for manufacturing the multilayered interlayer for safety glass concerning the present invention, preferably, both ends of the outlets for the inserted layer formation are positioned more inside in a width direction of the interlayer than both ends of the outlets for the first and the second outermost layers formation. In this case, the inserted layer may be embedded and sealed between the first and the second outermost layers in the obtained interlayer.

In the apparatus for manufacturing the multilayered interlayer for safety glass concerning the present invention at least a kind of third extruding machine for delivering the thermoplastic resin composition in a molten state may further be provided. In this case there are provided, to the guide for a layer disposition, a third delivering hole connected to the third extruding machine, a flow path whose one end is connected to the third delivering hole, and a third outlet for layer formation disposed between the outlets for the first and the second outermost layers formation, the third outlet for layer formation being provided in another end of the flow path. Thus, at least a kind of the third layer may further be laminated between the first and the second outermost layers in addition to the above-described inserted layer.

The method for manufacturing a multilayered interlayer for safety glass concerning the present invention is a method for manufacturing a multilayered interlayer for safety glass using the apparatus for manufacturing the multilayered interlayer for safety glass of the present invention, the method comprising:

a process for delivering, from the first extruding machine, the thermoplastic resin composition for the outermost layer formation in a molten state to the first delivering hole of the guide for a layer disposition, and for delivering, from the second extruding machine, a thermoplastic resin composition for the inserted layer formation in a molten state to the second delivering hole of the guide for a layer disposition;

a process for forcing the thermoplastic resin composition for the outermost layer formation in a molten state to arrive in the outlets for the first and the second outermost layers formation through the flow paths for the outermost layers formation in the guide for a layer disposition, and simultaneously for forcing the thermoplastic resin composition for the inserted layer formation in a molten state to arrive to the outlet for the inserted layer formation through the flow path for the inserted layer formation; and a process for extruding the thermoplastic resin compositions for the first and the second outermost layers formation and the thermoplastic resin composition for the inserted layer formation as a multilayered film, in a condition for the thermoplastic resin composition for the inserted layer formation delivered from the outlet for the inserted layer formation to be disposed between the thermoplastic resin compositions for the first and the second outermost layers formation delivered from the outlets for the first and the second outermost layers formation in the metal mold for extrusion.

Effect of the Invention

In the apparatus for manufacturing the multilayered interlayer for safety glass concerning the present invention, the first and the second resin compositions for the outermost layers formation and the resin composition for the inserted layer formation are delivered to the metal mold for extrusion, respectively from the outlets for the first and the second outermost layers formation and from the outlet for the inserted layer formation provided between the outlets for the first and the second outermost layers formation in a slit shape of the guide for a layer disposition, and they are extruded through the metal mold for extrusion to be formed into the multilayered interlayer for safety glass. In this case, since the above-described outlet for the inserted layer formation has a shape of a slit extending in a width direction of the interlayer, and the thickness of the slit is smaller with increasing proximity to the end in at least one end of the shape of the slit, the multilayered interlayer having a thickness gradually decreasing in the vicinity of at least one end rim of a strip-like inserted layer laminated between the first and the second outermost layers with increasing proximity to the end rim may be continuously manufactured.

That is, a gradation portion having a blurred boundary may be provided in at least one end rim of the colored belt in case of formation of a colored belt as the above-described inserted layer by manufacturing, using the manufacturing apparatus of the present invention, the multilayered interlayer for safety glass according to the manufacturing method of the present invention.

Moreover, omission of injection of the thermoplastic resin from the orifice, in formation of the above-described inserted layer, allows easy enlargement of the dimension in the width direction of the inserted layer along with the direction of the interlayer. That is, an inserted layer with a larger dimension in the width direction may be easily formed. Thereby, the dimension in the width direction of the colored belt may be easily enlarged in case of formation of the above-described inserted layer as a colored belt for a large-sized automobile windshield, leading to easier and more reliable formation suitable for a large-sized colored belt for a large-sized automobile windshield.

DESCRIPTION OF NOTATIONS

Figure 1:
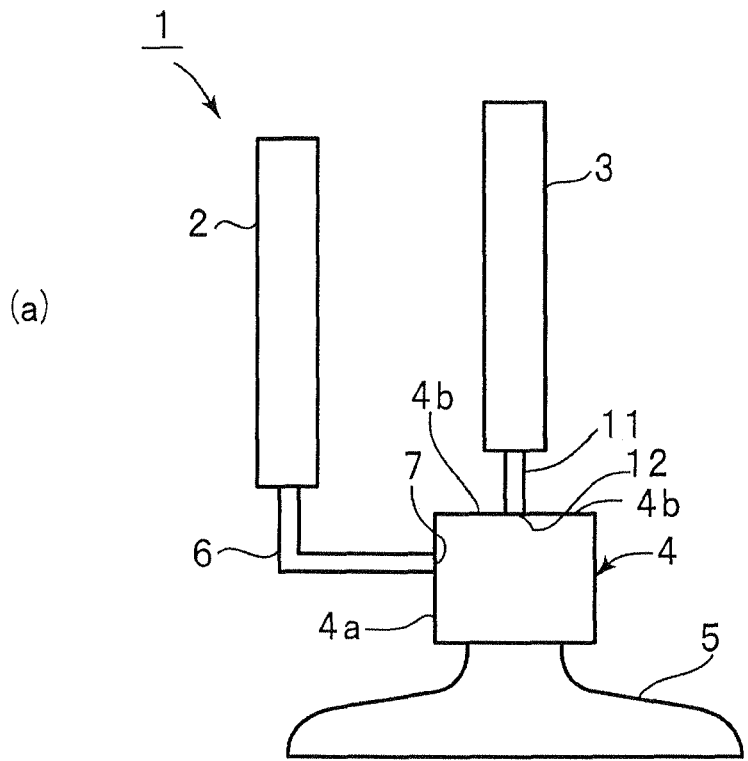
FIG. 1 (a) is a schematic plan view illustrating an outline configuration of the apparatus for manufacturing the multilayered interlayer for safety glass concerning one embodiment of the present invention, and (b) is a front view for describing a shape of the outlets for first and the second outermost layers formation, and the outlet for the inserted layer formation the outlets being outlets of each flow path provided in the guide for a layer disposition.
Figure 1:
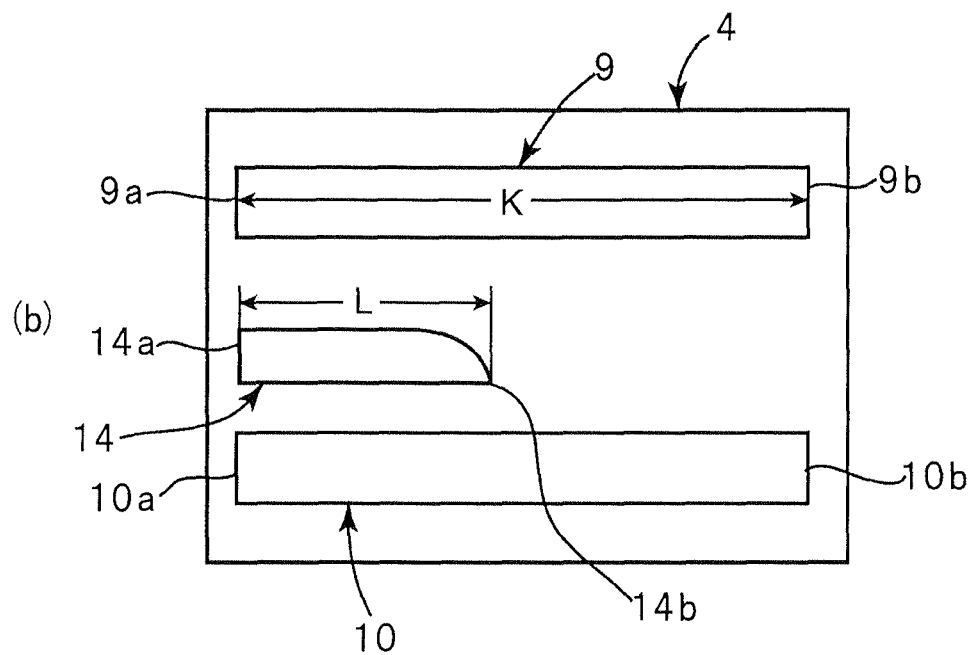

1—apparatus for manufacturing multilayered interlayer for safety glass
2, 3—extruding machine
4—guide for a layer disposition
4a—side face
4b—back face
5—metal mold for extrusion
5a—die plate 5b—preland
5c—land
5d—lip
6—adapter
7—first delivering hole
8—flow path for outermost layer formation
8a, 8b—first and second branching flow path
9, 10—outlet for first and second outermost layer formation
9a, 10a—end
9b, 10b—end
11—adapter
12—second delivering hole
13—flow path for inserted layer formation
14—outlet for inserted layer formation
14a, 14b—end of outlet for inserted layer formation
21—multilayered interlayer for safety glass
21a, 21b—end
22, 23—first and second outermost layer
24—inserted layer
24a, 24b—end
31—multilayered interlayer for safety glass
32—third layer
33—third outlet for layer formation
33a—end
35—multilayered interlayer for safety glass
36—third layer
37—third outlet for layer formation

BEST MODE FOR CARRYING OUT THE INVENTION

Hereinafter, detailed embodiments of the present invention will be described with reference to drawings to clarify the present invention.

FIG. 1 (a) is a schematic illustrative plan view of an apparatus for manufacturing a multilayered interlayer for safety glass concerning one embodiment of the present invention. The apparatus for manufacturing the multilayered interlayer for safety glass 1 concerning this embodiment is an apparatus for manufacturing a multilayered interlayer having an inserted layer for forming a colored belt laminated between the first and the second outermost layers, and having a partial three layered structure.

As illustrated in FIG. 1 (a), the manufacturing apparatus 1 has a first and second extruding machines 2 and 3. The first extruding machine 2 is an extruding machine that delivers a transparent thermoplastic resin composition for the outermost layer formation in a molten state to form the first and the second outermost layers. In this embodiment, the first outermost layer and the second outermost layer consist of the same thermoplastic resin composition. Each thermoplastic resin composition for the outermost layer formation for forming the first and the second outermost layers is, respectively, delivered from the first extruding machine 2. The second extruding machine 3 is provided in order to deliver a thermoplastic resin composition for an inserted layer formation for forming a colored belt. The above-described thermoplastic resin composition for the inserted layer formation includes pigments or dyes, as mentioned later, to form a colored belt.

A guide for a layer disposition 4 is connected to the first, and the second extruding machines 2, and 3 in a subsequent stage. A metal mold for extrusion 5 is connected to in a downstream side of the guide for a layer disposition 4.

Figure 2:
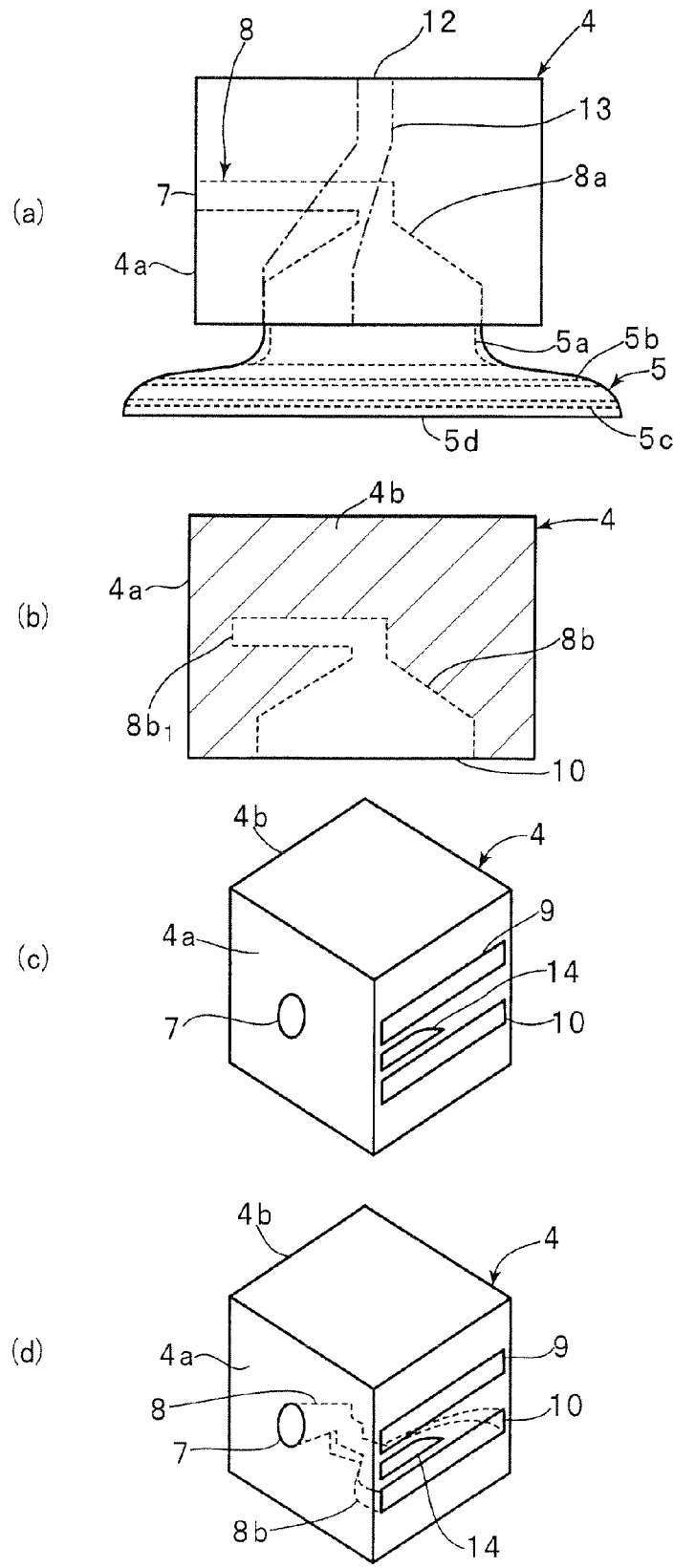
FIG. 2 (a) is a schematic plan view for describing a flow path in the guide for a layer disposition in the manufacturing apparatus of one embodiment of the present invention, (b) is a plan sectional view of a guide for a layer disposition, (c) is a perspective view of a guide for a layer disposition, and (d) is a perspective view illustrating schematically a part of a flow path in the guide for a layer disposition.

FIG. 2 (a) is a schematic plan view illustrating a relationship of a flow path and the metal mold for extrusion 5 that are provided in the above-described guide for a layer disposition 4. FIG. 2 (b) is a plan sectional view of the guide for a layer disposition 4. FIG. 2 (c) is a perspective view of the guide for a layer disposition 4. FIG. 2 (d) is a schematic perspective view illustrating a part of the flow path in the guide for a layer disposition 4.

The first extruding machine 2 is connected to the guide for a layer disposition 4 by an adapter 6. A first delivering hole 7 to which the adapter 6 is connected is formed in a side face 4a of the guide for a layer disposition 4. In the guide for a layer disposition 4, a flow path for the outermost layer formation 8 to which one end thereof is connected to the first delivering hole 7 is provided. In the guide for a layer disposition 4, the flow path for the outermost layer formation 8 is branched into the first and the second branching flow paths 8a and 8b. That is, the first branching flow path 8a is formed in an upper height position in the guide for a layer disposition 4. The second branching flow path 8b is provided downward, as illustrated in FIG. 2 (b) that illustrates a plan sectional view of a portion positioned downward. In the vicinity of an end $8b_1$ of the second branching flow path 8b, the second branching flow path 8b is connected to the first branching flow path 8a positioned above. In FIG. 2 (d), a portion of the flow path for the outermost layer formation 8 that extends to the second branching flow path 8 through a branch part (not illustrated) b is illustrated by broken lines. Here, illustration of the first branching flow path 8a is omitted. The ends of outlet side of the first and second branching flow paths 8a and 8b are the outlets for formation of the first and the second outermost layers 9 and 10. FIG. 1 (b) illustrates schematically a face of a portion connected to a metal mold for extrusion 5 of the guide for a layer disposition 4. Both of the outlet for the first outermost layer formation 9 and the outlet for the second outermost layer formation 10 have a cross section having a shape of a slit. The outlet for the first outermost layer formation 9 and the outlet for the second outermost layer formation 10 have a dimension K in a width direction.

As illustrated in FIG. 1 (a), the second extruding machine 3 is connected to the guide for a layer disposition 4 by an adapter 11. A second delivering hole 12 is formed in the back face 4b of the guide for a layer disposition 4. An adapter 11 is connected to the second delivering hole 12. Within the guide for a layer disposition 4, formed is a flow path for the inserted layer formation 13 whose one end is connected to the second delivering hole 12. Another end of the flow path for inserted layer formation 13 extends to the outlet for the inserted layer formation 14. The end of the outlet side of the flow path for inserted layer formation 13 is the outlet for the inserted layer formation 14. As illustrated in FIG. 1 (b), the outlet for the inserted layer formation 14 is disposed between the outlets for the first and the second outermost layers formation of 9 and 10. The outlet for the inserted layer formation 14 has a shape of a slit. One end 14a of the outlet for the inserted layer formation 14 is provided in a position overlapping with the ends 9a and 10a of the outlets for the outermost layers formation 9 and 10 in a height direction thereof. The dimension L in a width direction of the outlet for the inserted layer formation 14 is set smaller than the dimension K in a width direction of the outlets for the outermost layer formation 9 and 10. Therefore, the dimension in the width direction of the inserted layer will be smaller than the dimension in the width direction of the interlayer.

One end 14a of the above-described outlet for the inserted layer formation 14 is positioned in one end rim of the interlayer to be finally obtained. Since the end 14b on another side of the outlet for the inserted layer formation 14 does not reach to another side end rim of the interlayer, it is positioned, in the width direction of the interlayer, nearer to the end of the above-described side than the center. Furthermore, in this embodiment, the thickness of the slit is gradually made thinner as the outlet for inserted layer formation 14 approaches to the end 14b.

Figure 3:
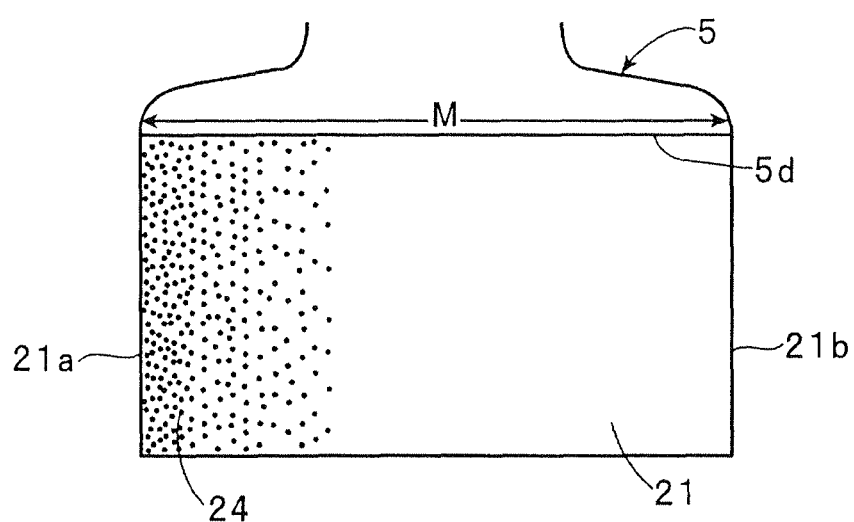
FIG. 3 is a schematic plan view for describing a process in which a multilayered interlayer for safety glass is extruded by the manufacturing apparatus of one embodiment of the present invention.

The metal mold for extrusion 5 is connected to the above-described guide for a layer disposition 4. Layers of the resin composition for outermost layers formation delivered from the outlets for the above-described first and the second outermost layers formation 9 and 10 and a layer of the resin composition for the inserted layer formation delivered from the outlet for the inserted layer formation 14 are delivered into the metal mold for extrusion 5. The above-described layers of the resin composition for outermost layers formation and the above-described layer of the resin composition for the inserted layer formation will merge with each other in a die plate 5a of the metal mold for extrusion 5 to form a laminated film. The die plate 5a has a relatively narrower width of a flow path in the inlet side as compared with a width of the flow path in the outlet side, and has the width of the flow path being widened to the outlet side. Therefore, a width of the laminated film becomes wider as it extends to the outlet side, and the thickness of the laminated film becomes thinner. The thickness of this laminated film is adjusted through a preland 5b and a land 5c. As illustrated in FIG. 3, a multilayered interlayer 21 for safety glass will be extruded from a lip 5d. Reference notation M in FIG. 3 represents a dimension in the width direction of the lip 5d.

Figure 4:
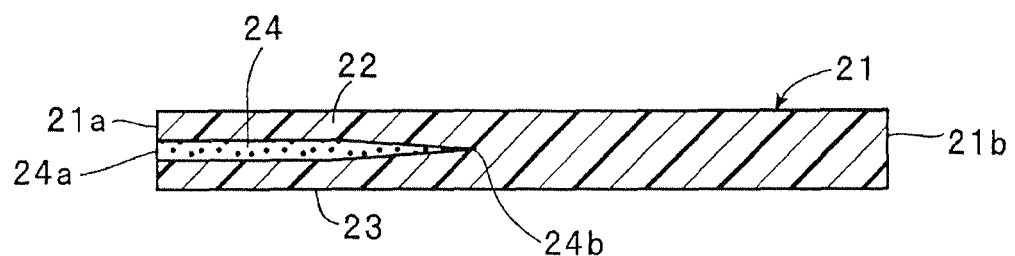
FIG. 4 is a cross-sectional view of a multilayered interlayer for safety glass obtained by the manufacturing apparatus of one embodiment of the present invention.

FIG. 4 illustrates a lateral cross sectional shape of a multilayered interlayer for safety glass 21 extruded in this embodiment. As is clear from FIG. 4, the multilayered interlayer for safety glass 21 has a first outermost layer 22, a second outermost layer 23, and an inserted layer 24 disposed between the first and second outermost layers 22 and 23. The inserted layer 24 is formed of the thermoplastic resin composition for the inserted layer formation extruded from the above-described outlet for the inserted layer formation 14. Accordingly, as is clear from FIG. 4, the inserted layer 24 extends from the first end 21a side toward the second end 21b side along with the width direction of the multilayered interlayer for safety glass 21, and the inside end 24b of the inserted layer 24 is positioned in the multilayered interlayer for safety glass 21. That is, since the dimension in the width direction L mentioned above is smaller than the dimension in the width direction K, the inserted layer 24 is formed as an area in a striped form along with the end rim in a lengthwise direction on the first end 21a side of the interlayer 21.

Therefore, an optimal colored belt for automobile windshield etc. will be formed of the inserted layer 24 by forming the inserted layer 24 by a colored thermoplastic resin composition layer. In this case, expansion of the dimension in the width direction L of the above-described outlet for the inserted layer formation 14 for forming the inserted layer 24 allows easy and reliable formation of the colored belt having a larger dimension in the width direction. That is, elimination of necessity of probes etc. allows stable formation of the colored belt having a larger dimension in the width direction. Moreover, the above-described inserted layer 24 has a thinner thickness with increasing proximity to the end 24b. Since the thickness of the inserted layer 24 becomes thinner with increasing proximity to the end 24b, formation of a gradation structure with a coloring degree that becomes gradually lighter on the end rim inside the colored belt may be attained.

Incidentally, in a portion in which the inserted layer 24 does not exist, the first and the second outermost layers 22 and 23 are integrated.

Therefore, in the case of production of the above-described multilayered interlayer for safety glass 21 using the apparatus for manufacturing the multilayered interlayer for safety glass 1 of this embodiment, the multilayered interlayer for safety glass having a gradation formed in the end rim in the width direction of the colored belt will be reliably and easily formed. Moreover, also in the case where enlargement of the dimension of the colored belt in the width direction, that is, the dimension in an upper and lower direction of the automobile windshield is needed to be enlarged etc., only enlargement of the dimension in the width direction L of the outlet for the inserted layer formation 14 in the above-described guide for the layer disposition 4 will allow easy formation of the colored belt having a larger dimension in the width direction. Furthermore, use of a large-sized guide for the layer disposition 4, and enlargement of the dimension in the width direction K of the outlets for the first and the second outermost layers formation 9 and 10 also enable easier correspondence to enlargement of the automobile windshield.

Incidentally, in the above-described embodiment, the outlet for the inserted layer formation 14 of the guide for a layer disposition 4 has a slit with a constant thickness on the end 14a side. As in the modification illustrated in FIG. 5 (a), both of the ends 14a and 14b of the outlet for the inserted layer formation 14 may have a thickness of the slit that becomes gradually smaller with increasing proximity to the end. In this case, for example, the colored belt formed of the inserted layer can have gradation structures on both of the end rims.

Figure 5:
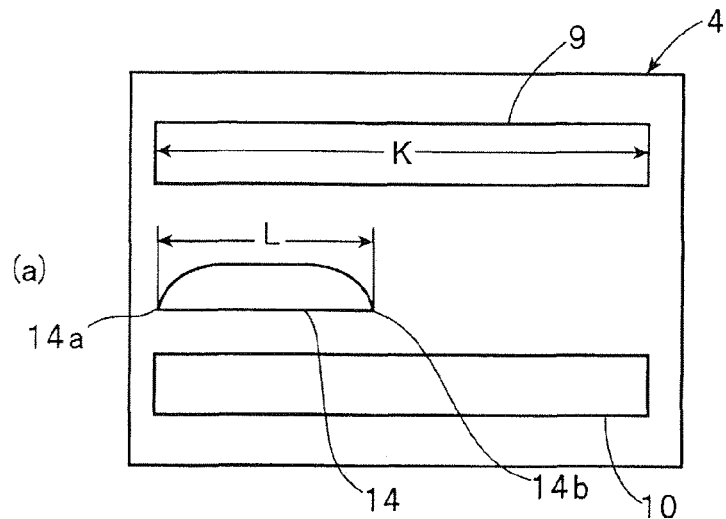
FIGS. 5 (a) and (b) are figures illustrating modifications of the manufacturing apparatus of the present invention, and are each a front view for describing a modification of the outlets for formation of the first and the second outermost layers and the outlet for the inserted layer formation provided in the outlet side of the guide for a layer disposition.
Figure 5:
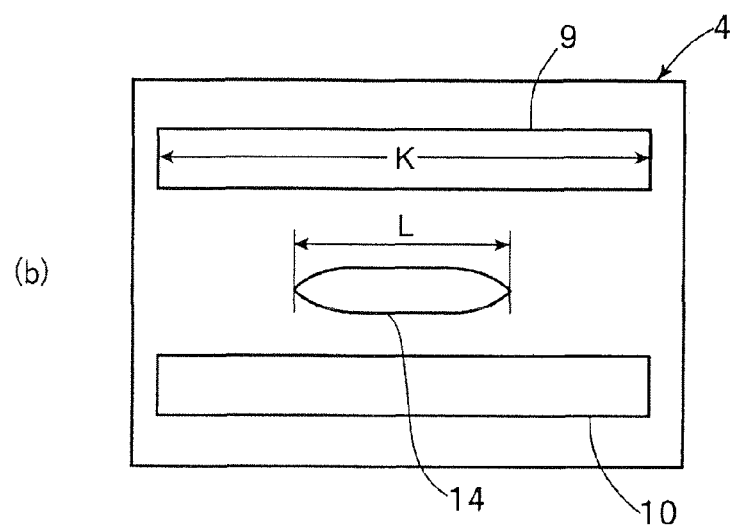

Furthermore, the outlet for the inserted layer formation 14 may be provided in the center in a width direction of the multilayered interlayer for safety glass finally obtained by lamination between the outlets for the first and the second outermost layers formation 9 and 10, as illustrated in FIG. 5 (b). In this case, the inserted layer may be sealed in the multilayered interlayer for the safety glass. In this way, the ends 14a and 14b of the outlet for the inserted layer formation 14 may be positioned inner side than the ends 9a, 9b, 10a, and 10b of the outlets for the outermost layers formation.

Furthermore, as illustrated in FIG. 5 (b), in a structure where the thickness of the slit of the outlet for the inserted layer formation 14 becomes thinner with increasing proximity to the end, the thickness of the slit may be varied so that both of the upper surface and under surface of the slit may approach.

In the embodiment illustrated in FIG. 1 (a), the thermoplastic resin composition for the outermost layer formation was delivered from the first extruding machine 2, and the flow path for the outermost layer formation 8 was branched to the first and the second branching flow paths 8a and 8b in the guide for a layer disposition 4. Alternatively, in order to form the first outermost layer and the second outermost layer, respectively, a pair of the first extruding machines may be provided. In this case the guide for a layer disposition 4 does not have the above-described branching flow path, but the first and the second flow paths for the outermost layers formation are provided, respectively. The resin delivering hole in the inlet side of the first flow path for the outermost layer formation may just be connected to one of the extruding machine of the pair of extruding machine, and the outlet side may just be positioned to the first outlet for the outermost layer formation 9. Furthermore, the delivering hole in the inlet side of the second flow path for the outermost layer formation may just be connected to the extruding machine in another side of the pair of the first extruding machine, and the outlet side may just be positioned to the second outlet for the outermost layer formation 10. In this case, the first and the second outermost layers may be formed with thermoplastic resin compositions having mutually different compositions.

Figure 6:
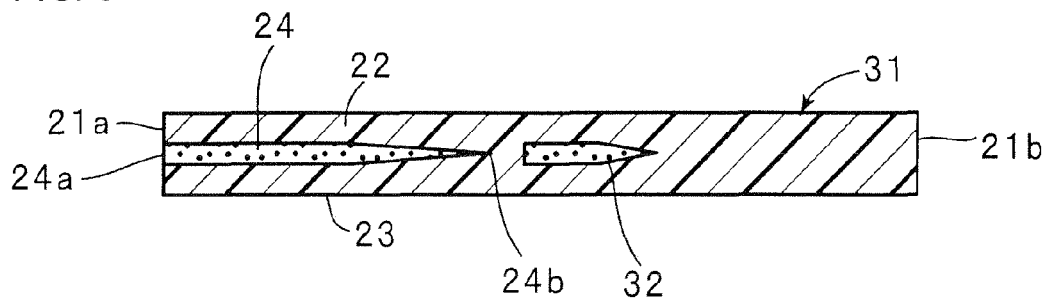
FIG. 6 is a cross-sectional view of a multilayered interlayer for safety glass obtained by modification of the manufacturing apparatus of the present invention.

Furthermore, in the present invention, a third layer 32 may further be inserted in addition to the above-described inserted layer 24, in a position without the inserted layer 24 in a width direction of the multilayered interlayer for safety glass 31, between the first and the second outermost layers 22 and 23, as in the multilayered interlayer 31 for safety glass illustrated in FIG. 6. Here, the third layer 32 is provided in the center in a width direction of the multilayered interlayer for safety glass 31. The first and the second outermost layers 22 and 23 are integrated in a portion that does not have the inserted layer 24 and the third layer 32. The third layer 32 is formed with a thermoplastic resin composition etc.

Figure 7:
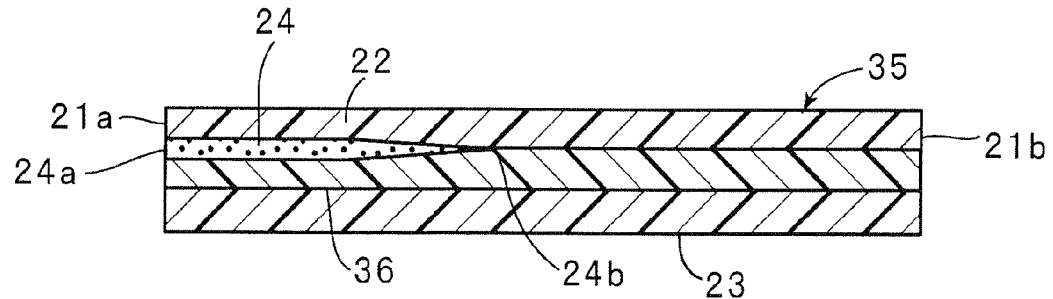
FIG. 7 is a cross-sectional view of a multilayered interlayer for safety glass obtained by an other modification of the manufacturing apparatus of the present invention.

Furthermore, as in the multilayered interlayer for safety glass 35 illustrated in FIG. 7, a third layer 36 may further be laminated between the inserted layer 24 and the second outermost layer 23. Here, the third layer 36 may be formed with a thermoplastic resin composition having a composition different from that of the first and the second outermost layers 22 and 23. Furthermore, the dimension in the width direction of the third layer 36 is set equal to the dimension in the width direction of the first and the second outermost layers 22 and 23. However, the dimension in the width direction of the third layer 36 may be different from the dimension in the width direction of the first and the second layers 22 and 23.

In production these multilayered interlayers for safety glass 31, 35, at least a kind of a third extruding machine for delivering a thermoplastic resin composition for forming the third layers 32 and 36, etc. may be provided in the manufacturing apparatus, and furthermore a third delivering hole connected to the third extruding machine, a flow path connected to the third delivering hole, and a third outlet for layer formation disposed between the outlets for the first and the second outermost layers formation, the third outlet being provided in an end in an opposite side of the third delivering hole of the flow path, may just be provided in the guide for a layer disposition.

Figure 8:
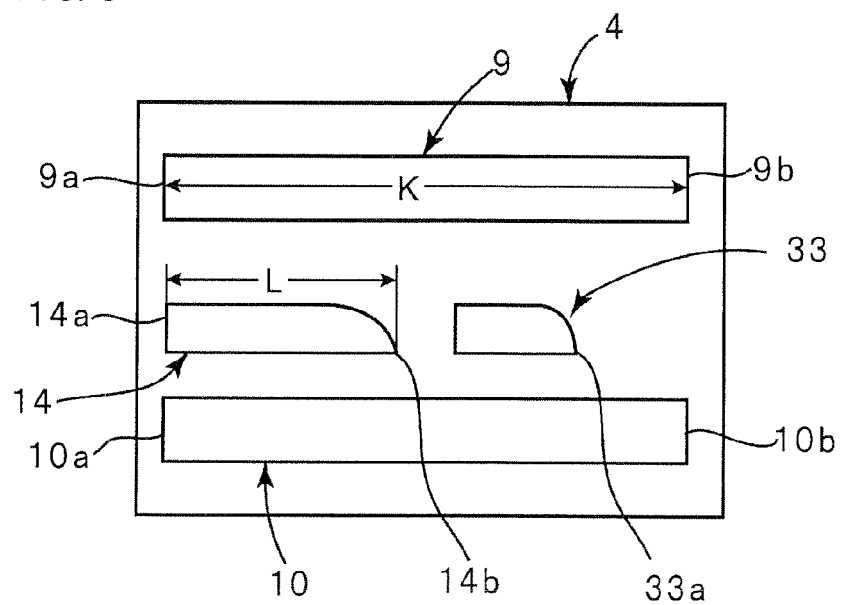
FIG. 8 is a figure illustrating a modification of the manufacturing apparatus of the present invention, and is a front view for describing an outlet for the third thermoplastic resin composition layer formation provided in the outlet of the guide for a layer disposition.

In production of the above-described multilayered interlayer for safety glass 31, in detail, a third outlet for layer formation 33 may just be provided in the guide for a layer disposition in a position without the outlet for the inserted layer formation 14 between the first outlet for the outermost layer formation 9 and the first outlet for the outermost layer formation 10, as in a modification illustrated in FIG. 8. Here, the third outlet for layer formation 33 is provided in the center in a width direction of the multilayered interlayer for safety glass obtained by final lamination. The third outlet for layer formation 33 and the outlet for the inserted layer formation 14 are mutually separated. The third outlet for layer formation 33 has almost the same shape as that of the outlet for the inserted layer formation 14. The third outlet for layer formation 33 has a thickness of the slit that becomes gradually smaller with increasing proximity to an end 33a in an opposite side to the side in which the inserted layer 24 is provided. The dimension in the width direction of the third outlet for layer formation 33 is set smaller than the dimension L in the width direction of the outlet for the inserted layer formation 10.

Furthermore, the third layer 32 may be formed with a thermoplastic resin composition having the same composition as the composition of the inserted layer 24. In this case, the second extruding machine may deliver the thermoplastic resin composition for forming the third layer 32, without providing the above-described third extruding machine in the manufacturing apparatus. A flow path for inserted layer formation whose one end is connected to the second delivering hole 12 may be branched to the first and the second branching flow paths in the guide for a layer disposition 4. And furthermore, the outlet side end of the first branching flow path may be used as the outlet for the inserted layer formation 14, and the outlet side end of the second branching flow path may be used as the third outlet for layer formation 33.

Figure 9:
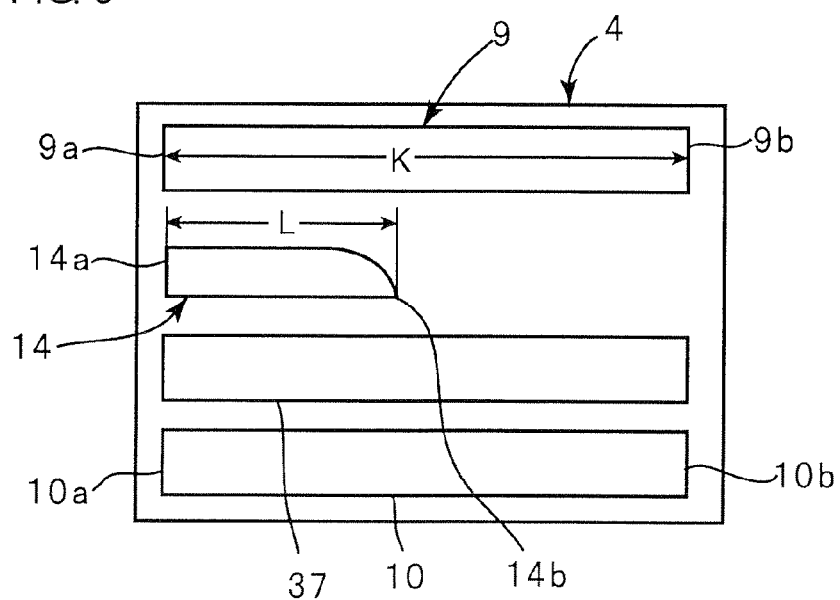
FIG. 9 is a figure illustrating an other modification of the manufacturing apparatus of the present invention, and is a front view for describing an outlet for the third thermoplastic resin composition layer formation provided in the outlet of the guide for a layer disposition.

In production of the above-described multilayered interlayer for safety glass 35, in detail, as in a modification illustrated in FIG. 9, a third outlet for layer formation 37 may be provided between the outlet for the inserted layer formation 14 and the second outlet for the outermost layer formation 10. Here, the dimension in a width direction of the third outlet for layer formation 37 is set equal to the dimension K in a width direction of the outlets for the first and the second outermost layers formation 9 and 10.

Incidentally, the third layer 36 may be formed with the same thermoplastic resin composition as that of the first and the second outermost layers 22 and 23. In this case, the first extruding machine may deliver the thermoplastic resin composition for forming the third layer 36, without providing the above-described third extruding machine in the manufacturing apparatus. A third branching flow path other than the first and the second branching flow paths may further be provided to a flow path for the outermost layer formation whose one end is connected to the first delivering hole 7 in the guide for a layer disposition 4, and the outlet side end of the third branching flow path may just be used as the third outlet for layer formation 37. Incidentally, also in the case where the third layer 36 is formed, the first outermost layer and the second outermost layer 23 may be formed with thermoplastic resin compositions having mutually different compositions. Here, the third layer may be laminated between the first outermost layer 22 and the inserted layer 24. In such a case, the third outlet for layer formation may be provided between the first outlet for the outermost layer formation 9 and the outlet for the inserted layer formation 14.

Incidentally, FIG. 1 (a) illustrates the guide for a layer disposition 4 and the metal mold for extrusion 5 as separate members. The metal mold for extrusion 5 and the guide for a layer disposition 4 may also be integrated.

In addition, materials to be used in production of the multilayered interlayer for safety glass using the apparatus for manufacturing the multilayered interlayer for safety glass of the above-described embodiments are not in particular limited. Thermoplastic resins to be used for the first, the second outermost layers, and the inserted layer are not especially limited as long as the resins are extrudable. The above-described thermoplastic resins include: vinyl chloride resins, polyvinyl acetals, polyesters, ethylene-vinyl acetate resins, urethane resins etc.

Incidentally, the colored thermoplastic resin composition layer for the above-described inserted layer is, for example, formed using a colored thermoplastic resin composition including the above-described thermoplastic resins, dyes or pigments, etc.

In addition, in formation of the above-described multilayered interlayer for safety glass, the first, the second outermost layer, and the inserted layer may include ultraviolet absorbers, respectively, thereby suppressing transmission of ultraviolet rays. It is preferred that the above-described inserted layer includes a larger amount of ultraviolet absorbers than in the first and the second outermost layers. In this case, the transmission of ultraviolet rays will be avoided more effectively in the inserted layer. Therefore, disposition of the inserted layer in the upper part of the automobile windshield can further reduce the transmission of ultraviolet rays included in sunlight.

Incidentally, in the present invention, thermal insulative inorganic particles, organic compounds etc. having absorption band in the infrared region, etc. may be blended in the first, the second outermost layer, and the inserted layer in order to improve thermal insulation property. The above-described thermal insulative inorganic particles include: tin-doped indium oxide, antimony-doped tin oxide, gallium-doped zinc oxide and lanthanum hexaboride etc.

Furthermore, as the above-mentioned third layer, a thermal insulative resin layer including the above-described thermal insulative inorganic particles and infrared absorption agents may be laminated in addition to the above-described inserted layer.

Use of the manufacturing apparatus 1 of the above-described embodiment may provide a partial inserted layer in the multilayered interlayer for safety glass. For this reason, in use of the thermal insulative resin layer, the thermal insulative resin layer may be formed as an inserted layer only in a portion that needs thermal insulative property.

As described above, coloring of the inserted layer, use of the thermal insulative resin in the inserted layer, and blending of an ultraviolet absorber in the inserted layer may allow development of various functions in the inserted layer, thereby allowing, for example, cancellation of glare of sunlight given to the driver of automobiles, and simultaneous shielding of ultraviolet rays and heat rays.

The manufacturing apparatus of the present invention may be used also as an apparatus for manufacturing the multilayered interlayer for safety glass used for not only automobiles but airplanes, buildings, etc. Use in buildings does not need so excellent visibility for safety glass as compared with a case in use in automobiles, airplanes, etc. However, shielding belts may be formed in the upper part and the lower part of the safety glass for privacy protection or crime prevention. In the present invention, mixing of silica particles or calcium carbonate particles to the material for forming the inserted layer can provide such a shielding belt more easily.

What is claimed is:

1. A method for manufacturing a multilayered interlayer for safety glass having a first and a second outermost layers and an inserted layer disposed between the first and the second outermost layers, said method using an apparatus configured for manufacturing the multilayered interlayer for safety glass, said apparatus comprising:
a first extruding machine for delivering a thermoplastic resin composition for the outermost layer formation for forming the first and the second outermost layers;
a second extruding machine for delivering a thermoplastic resin composition for the inserted layer formation for forming the inserted layer;
a first delivering hole through which the thermoplastic resin composition for the outermost layer formation is delivered, the first delivering hole being connected to the first extruding machine;
a second delivering hole through which the thermoplastic resin composition for the inserted layer formation is delivered, the second delivering hole being connected to the second extruding machine;
outlets for the first and the second outermost layers formation, the outlets for the first and the second outermost layers formation being spaced apart from one another and each having a slit shape corresponding to sectional shapes of the respective first and second layers;
an outlet for the inserted layer formation for forming the inserted layer, the outlet being disposed between the outlets for the first and the second outermost layers formation;
a flow path for the outermost layer formation connecting the first delivering hole and the outlets for the first and the second outermost layers formation;
a guide for a layer disposition, the guide having a flow path for the inserted layer formation that connects the second delivering hole and the outlet for the inserted layer formation;
a metal mold for extruding the interlayer obtained by lamination of the resin compositions for the first and the second outermost layers formation, and the resin composition for the inserted layer formation that have been delivered, the metal mold being connected to the outlets for the first and the second outermost layers formation and the outlet for the inserted layer formation of the guide for the layer disposition;
wherein the outlet for the inserted layer formation is provided in the guide for a layer disposition has a shape of a slit extending in a width direction of the interlayer, and has a smaller thickness of the slit with increasing proximity to one end in at least the one end of the shape of a slit, said method comprising:
a process for delivering, from the first extruding machine, the thermoplastic resin composition for the outermost layer formation in a molten state to the first delivering hole of the guide for a layer disposition, and
for delivering, from the second extruding machine, a thermoplastic resin composition for the inserted layer formation in a molten state to the second delivering hole of the guide for a layer disposition;
a process for forcing the thermoplastic resin composition for the outermost layer formation in a molten state to arrive in the outlets for the first and the second outermost layers formation through the flow paths for the outermost layers formation in the guide for a layer disposition, and simultaneously for forcing the thermoplastic resin composition for the inserted layer formation in a molten state to arrive to the outlet for the inserted layer formation through the flow path for the inserted layer formation; and
a process of extruding the thermoplastic resin compositions for the first and the second outermost layers formation, and the thermoplastic resin composition for the inserted layer formation as a multilayer film, in a condition for the thermoplastic resin composition for the inserted layer formation delivered from the outlet for the inserted layer formation to be disposed between the thermoplastic resin compositions for the first and the second outermost layers formation delivered from the outlets for the first and the second outermost layers formation in the metal mold for extrusion,
wherein a first delivering hole provided in the guide for the layer disposition is connected to the first extruding machine for the outermost layer formation, one end of the flow path for formation of the outermost layer is connected to the first delivering hole in the guide for the layer disposition, the flow path for the outermost layer formation is branched to separate first and second branching flow paths midway therebetween, and ends of the first and the second branching flow paths are connected to outlets for the first and the second outermost layer formation, respectively.

2. The method for manufacturing the multilayered interlayer for safety glass according to claim 1, wherein
a pair of the first or second extruding machines are provided in order to form the first and the second outermost layers and/or the inserted layer, a pair of the first or second delivering holes connected to a pair of the first or second extruding machines are respectively formed in the guide for a layer disposition, one of the delivering hole out of the pair of the first or second delivering holes is connected to one of the outlets for the outermost or inserted layer formation to form a first flow path, and another delivering hole out of the pair of the first or second delivering holes is connected to one of the outlets for the outermost or inserted layer formation to form a second flow path, wherein one or both of the first and second flow paths is branched respectively to separate first and second branching flow paths midway therebetween.

3. The method for manufacturing the multilayered interlayer for safety glass according to claim 1, wherein the thickness of the slit decreases towards both ends of the outlet for the inserted layer formation.

4. The method for manufacturing the multilayered interlayer for safety glass according to claim 1, wherein the thickness of the slit decreases toward one end of outlet for the inserted layer formation, and in another end, the thickness of the slit does not decrease toward the end, but the thickness of the slit is constant.

5. The method for manufacturing the multilayered interlayer for safety glass according to claim 1, wherein at least one end of the outlet for the inserted layer formation is aligned to the end of the outlets for the first and the second outermost layers formation in a width direction of the interlayer.

6. The method for manufacturing the multilayered interlayer for safety glass according to claim 1, wherein each end of the outlets for the inserted layer formation is positioned between the ends of the outlets for the first outermost layer formation and between the ends of the outlet for the second outermost layers formation.

7. The method for manufacturing the multilayered interlayer for safety glass according to claim 1, wherein a third extruding machine for delivering the thermoplastic resin composition in a molten state is further provided, the guide for a layer disposition has a third delivering hole connected to the third extruding machine, a flow path whose one end is connected to the third delivering hole, and a third outlet for layer formation disposed between the outlets for the first and the second outermost layers formation, the third outlet for layer formation being provided in another end of the flow path.

8. A method for manufacturing a multilayered interlayer for safety glass having a first and a second outermost layers and an inserted layer disposed between the first and the second outermost layers, the method comprising:

a process for delivering, from a first extruding machine, a thermoplastic resin composition for the outermost layer formation in a molten state to a first delivering hole of a guide for a layer disposition, and for delivering, from a second extruding machine, a thermoplastic resin composition for the inserted layer formation in a molten state to a second delivering hole of the guide for a layer disposition;

a process for forcing the thermoplastic resin composition for the outermost layer formation in the molten state to arrive in outlets for the first and the second outermost layers formation through flow paths for the outermost layers formation in the guide for the layer disposition, and simultaneously for forcing the thermoplastic resin composition for the inserted layer formation in the molten state to arrive to an outlet for the inserted layer formation through a flow path for the inserted layer formation; and a process of extruding the thermoplastic resin compositions for the first and the second outermost layers formation, and the thermoplastic resin composition for the inserted layer formation as a multilayer film, in a condition for the thermoplastic resin composition for the inserted layer formation delivered from the outlet for the inserted layer formation to be disposed between the thermoplastic resin compositions for the first and the second outermost layers formation delivered from the outlets for the first and the second outermost layers formation in a metal mold for extrusion, wherein outlets for the first and the second outermost layers formation is spaced apart from one another and each has a slit shape corresponding to sectional shapes of the respective first and second layers, wherein the outlet for the inserted layer formation for forming the inserted layer is disposed between the outlets for the first and the second outermost layers formation, and wherein the first delivering hole provided in the guide for the layer disposition is connected to the first extruding machine for the outermost layer formation, one end of a flow path for formation of the outermost layer is connected to the first delivering hole in the guide for the layer disposition, the flow path for the outermost layer formation is branched to separate first and second branching flow paths midway therebetween, and ends of the first and the second branching flow paths are connected to outlets for the first and the second outermost layer formation, respectively.

* * * * *